United States Patent [19]

Aker

[11] Patent Number: 4,477,896

[45] Date of Patent: Oct. 16, 1984

[54] SINGLE-WIRE DATA TRANSMISSION SYSTEM HAVING BIDIRECTIONAL DATA SYNCHRONIZATION, AND D.C. POWER FOR REMOTE UNITS

[76] Inventor: Eric M. Aker, 34 Lodge Rd., Newton, Mass. 02165

[21] Appl. No.: 307,786

[22] Filed: Oct. 2, 1981

[51] Int. Cl.³ .............................................. H04B 1/56
[52] U.S. Cl. ........................................ 370/24; 370/11
[58] Field of Search ..................... 370/24, 29, 11, 100; 340/825.1, 825.11, 870.13, 870.14; 375/36

[56] References Cited

U.S. PATENT DOCUMENTS

| | | | |
|---|---|---|---|
| 3,303,470 | 2/1967 | Brixner et al. | 340/825.1 |
| 3,355,548 | 11/1967 | Hodge | 178/68 |
| 3,440,346 | 4/1969 | Norby | 178/67 |
| 3,646,274 | 2/1972 | Nadir et al. | 179/15 BA |
| 3,748,411 | 7/1973 | Heyes et al. | 179/170 J |
| 3,835,252 | 9/1974 | Ananiades et al. | 178/68 |
| 3,943,283 | 3/1976 | Caragliano et al. | 178/58 |
| 3,943,284 | 3/1976 | Nelson | 370/24 |
| 3,993,867 | 11/1976 | Blood, Jr. | 178/58 |
| 4,052,566 | 10/1977 | MacKay | 179/15 A |
| 4,053,714 | 10/1977 | Long | 370/100 |
| 4,078,196 | 3/1978 | Thadani | 340/870.13 |
| 4,097,692 | 6/1978 | Felix | 179/2.5 R |
| 4,228,422 | 10/1980 | Perry | 340/310 A |
| 4,363,121 | 12/1982 | Schlyter | 370/11 |
| 4,378,598 | 3/1983 | Ludikar | 370/86 |

*Primary Examiner*—Douglas W. Olms
*Attorney, Agent, or Firm*—Hamilton, Brook, Smith & Reynolds

[57] ABSTRACT

A communication system is described in which information may be simultaneously transmitted in both directions over a single common wire between a base unit and a plurality of remote units. The information from the remote units is sent in the form of time divided multiplexed *current* pulses and the information from the base units is sent in the form of time divided *voltage* pulses. Optionally, the voltage signals ride on top of a D.C. potential which is extracted at the remoted units to power them.

15 Claims, 12 Drawing Figures

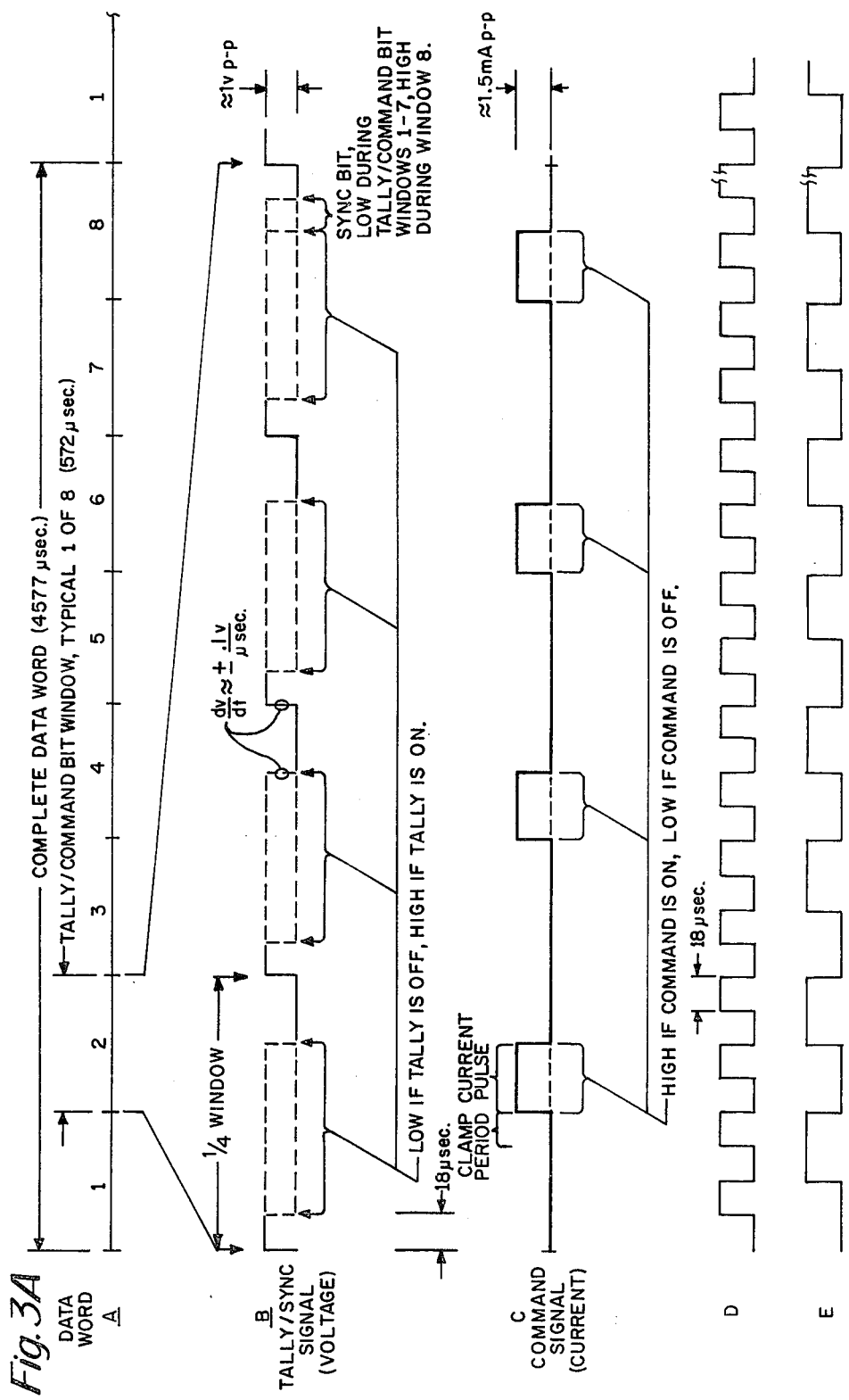

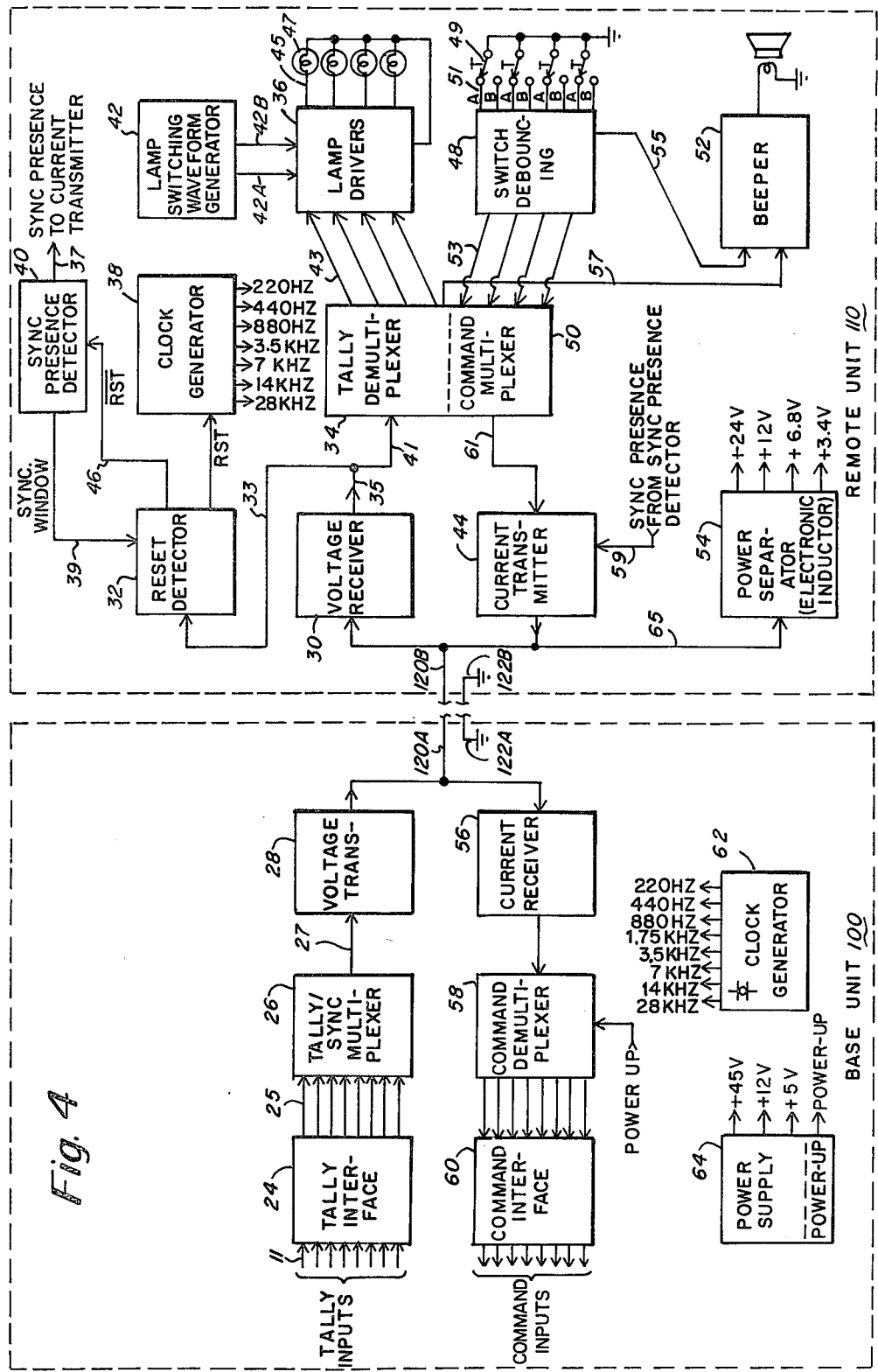

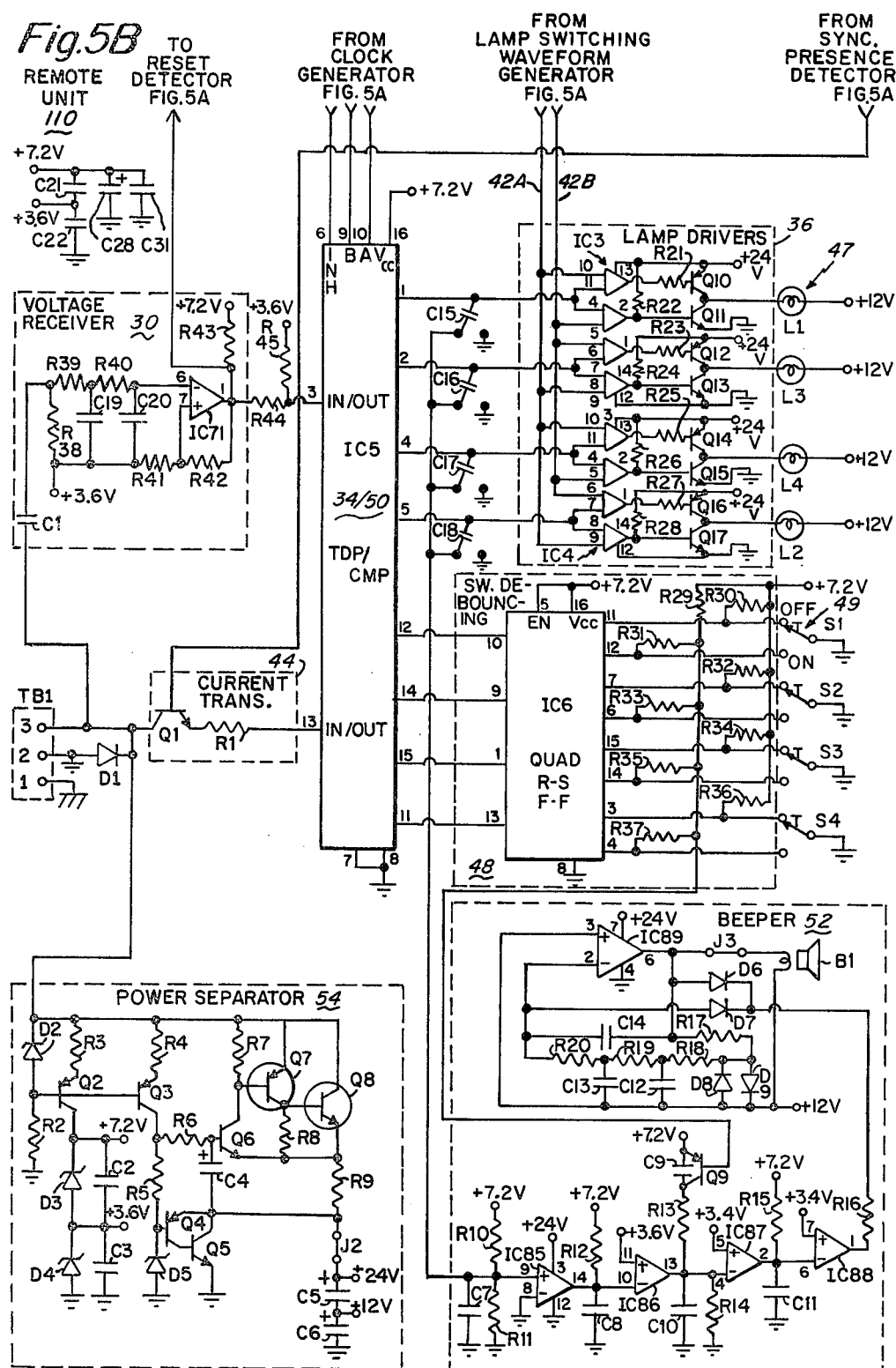

SINGLE-WIRE DATA TRANSMISSION SYSTEM HAVING BIDIRECTIONAL DATA SYNCHRONIZATION, AND D.C. POWER FOR REMOTE UNITS

DESCRIPTION

Field of the Invention

This invention relates to data communication systems and, more particularly, to communication between a base unit and a plurality of remote units over a single line in both directions simultaneously.

Description of the Background

It is desirable to be able to communicate between a base unit and a remote unit utilizing as few wires as possible. For example, in a television station, a base unit comprising a number of large and expensive TV recording instruments is often shared by a number of remote units. Tally signals setting forth the status of various instruments at the base unit must be transmitted in one direction to each of a plurality of parallel connected remote units. Conversely, command signals must be simultaneously transmitted in the opposite direction from each of the remote units to the base unit to operate the instruments at the base unit.

The current practice in such installations is to connect each remote unit in parallel with each other and in series with the base unit through a switch, and successively switch each unit into the base unit circuit. This necessitates a highly complex and expensive switching mechanism and a plurality of lengthy cable means. Alternatively, the switching is sacrificed at the expense of operating flexibility.

Additionally, in some conditions of operation of the remote units, ready access to electrical power is unavailable. Accordingly, it would be desirable to provide power for the remote units from the base unit thereby normally necessitating additional wires and/or switching capabilities.

U.S. Pat. No. 3,835,252 shows a circuit for transmitting information from any one unit to *all* other units on a single bidirectional transmission line which is terminated at each end by its characteristic impedance and wherein a voltage/current scheme is used to transmit in both directions by time sharing of signals. The "252" system requires a common clock 14 to generate and transmit clock pulses to each unit thereby necessitating added wiring between units. Furthermore, in the "252" system, one unit transmits to all other units whereas it may be desirable, as previously stated above, to have any one unit (remote unit) transmit just to one other unit (base unit). Lastly, since the transmission line is terminated at its characteristic impedance, it would be difficult because of power losses, to power individual units from a single unit.

U.S. Pat. No. 3,993,867, which permits full duplex transmission of digital data on a single signal line, suffers from the same problems as the "252" patent except that apparently it will operate without a common clock.

U.S. Pat. No. 4,097,692 discloses a method for two-way transmission of data between a plurality of "out-stations" and at least one "control" unit. The solution described in "692" is to frequency modulate the data and apply it to the three phase power supply wires connecting the "control" unit to the "out-stations". The data signal is a PCM voltage/current signal and power for all units is not provided by the "control" unit. Frequency modulation involves expensive analog modulating equipment and increases the complexity of the system.

A need therefore exists for a system of bidirectional communication between a plurality of remote locations and a central or base location utilizing a minimum of interconnections and wherein the synchronization and power for the remote locations is supplied from the base location.

Disclosure of the Invention

In the apparatus and method of the present invention, digital communication is achieved over a single common wire (plus a ground wire or common ground, if available) between a first unit (base unit) and a plurality of remote units. Information, such as command signals (calling for the operation of equipment at the base unit) are sent from the remote units to the base unit by time divisional multiplexing of *current* pulses. Information, such as tally signals (indicating the status of equipment at the base unit) are sent from the base unit to the remote units by time divisional multiplexing of *voltage* pulses.

The tally (voltage) signals are logic signals which ride on top of a D.C. potential. This potential is used to power the remote units. Also, a portion of the tally signal time domain is used to supply a synchronizing signal to the remote units.

At the remote units, the D.C. potential is extracted by an "electronic inductor". A sync presence detector in the remote unit determines that proper synchronizing signals are being received from the base unit. If not, the remote unit is prevented from transmitting information so as to avoid sending false command signals.

The rate of change of the tally signal with respect to time ($dv/dt$) is maintained at a low enough rate to prevent cross-talk with the current signal and yet fast enough to maintain appropriate speed of operation. Because of the logic format of the present invention, the tally signal may be transmitted in one direction (base unit to remote units) while at the same time, the command signal is transmitted on the same wire in the opposite direction (remote unit to base unit) without interfering with one another. There is thus provided, a unique communication system for bidirectional transmission over a single wire between a plurality of remote locations and one central on base location and in which the synchronization signal and power for operation at the remote site is supplied from the base unit on the same single wire.

These and other features and advantages of the invention will be explained in more detail in connection with the drawings.

BRIEF DESCRIPTION OF THE DRAWINGS

FIGS. 3A and 3B are a series of waveform diagrams showing the current and voltage pulses used in the invention.

FIG. 4 is a detailed block diagram of a base unit and remote unit of the invention.

FIGS. 5A and 5B are a schematic diagram of a typical remote unit of the invention.

BEST MODE OF CARRYING OUT THE INVENTION

The following description refers to a preferred embodiment in which eight independent logic (tally) signals representing the status of equipment at a "base unit" are transmitted over a single wire (plus ground) "bus" to ten "remote" units connected in parallel on the "bus". Simultaneously, each remote unit may transmit, in the opposite direction, eight independent logic (command) signals representing operating instructions to the equipment at the base unit. It should be emphasized that the use of eight signals and ten remote units is not an inherent limitation but merely represents a typical requirement.

Figure 1:
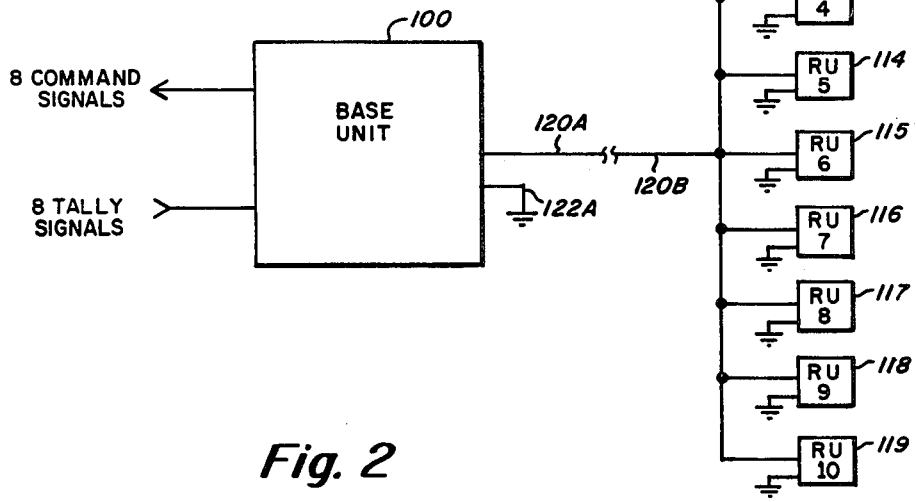
FIG. 1 is a block diagram of a typical system of the invention.

Referring now to FIG. 1, there is shown an overall diagram of the invention in which a plurality of remote units, in this case ten, 110–119, are connected in parallel with one end 120B of bus wire 120. The other end 120A of bus wire 120 is connected to base unit 100. A common ground wire may be run in parallel with the bus wire 120 and be connected between the base unit 100 and each remote unit or the base unit 100 and each remote unit may be individually grounded to a common reference.

Figure 2:
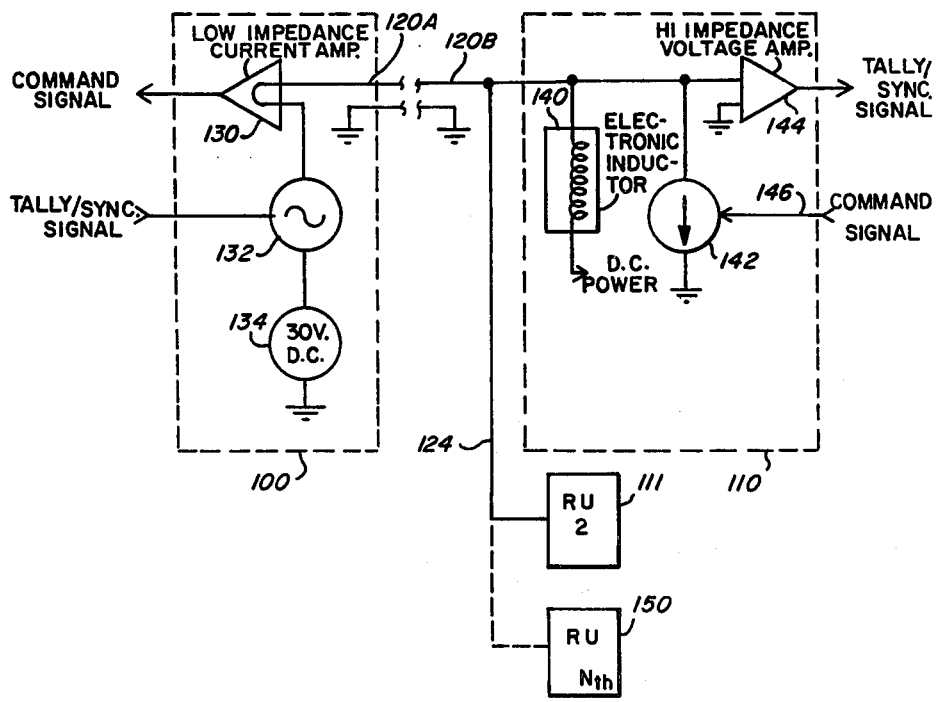
FIG. 2 is a generalized block diagram showing one base unit and one remote unit of the invention.

Referring now to FIG. 2, the base unit 100 generally comprises a 30 volt D.C. power supply connected to a voltage transmitter 132. The voltage transmitter 132 is modulated by time divisional multiplexed signals to generate eight independent tally *voltage* signals which ride on top of the 30 volts D.C. from power supply 134.

These tally voltage signals are coupled to each remote unit 110, 111, 150 via bus wire 120. The 30 volts D.C. from the power supply 134 is extracted by an electronic inductor 140 which is a device which passes D.C. but presents a high impedance to A.C. The "tally" voltage signals are amplified in high impedance amplifier 144 and sent to appropriate display circuitry to indicate at the remote location the status of equipment at the base unit 100.

Simultaneously with the above, command signals may be generated at each remote unit. These command signals take the form of eight independent logic *current* signals which are generated by modulating current transmitter 142. Transmitter 142 is grounded on one side and on the other side is coupled to "bus" bar 120B and via bus bar 120A to a low impedance current amplifier 130 at the base unit 100; where the command current signals from the remote units are amplified and used to operate the base unit equipment.

Figure 3B:
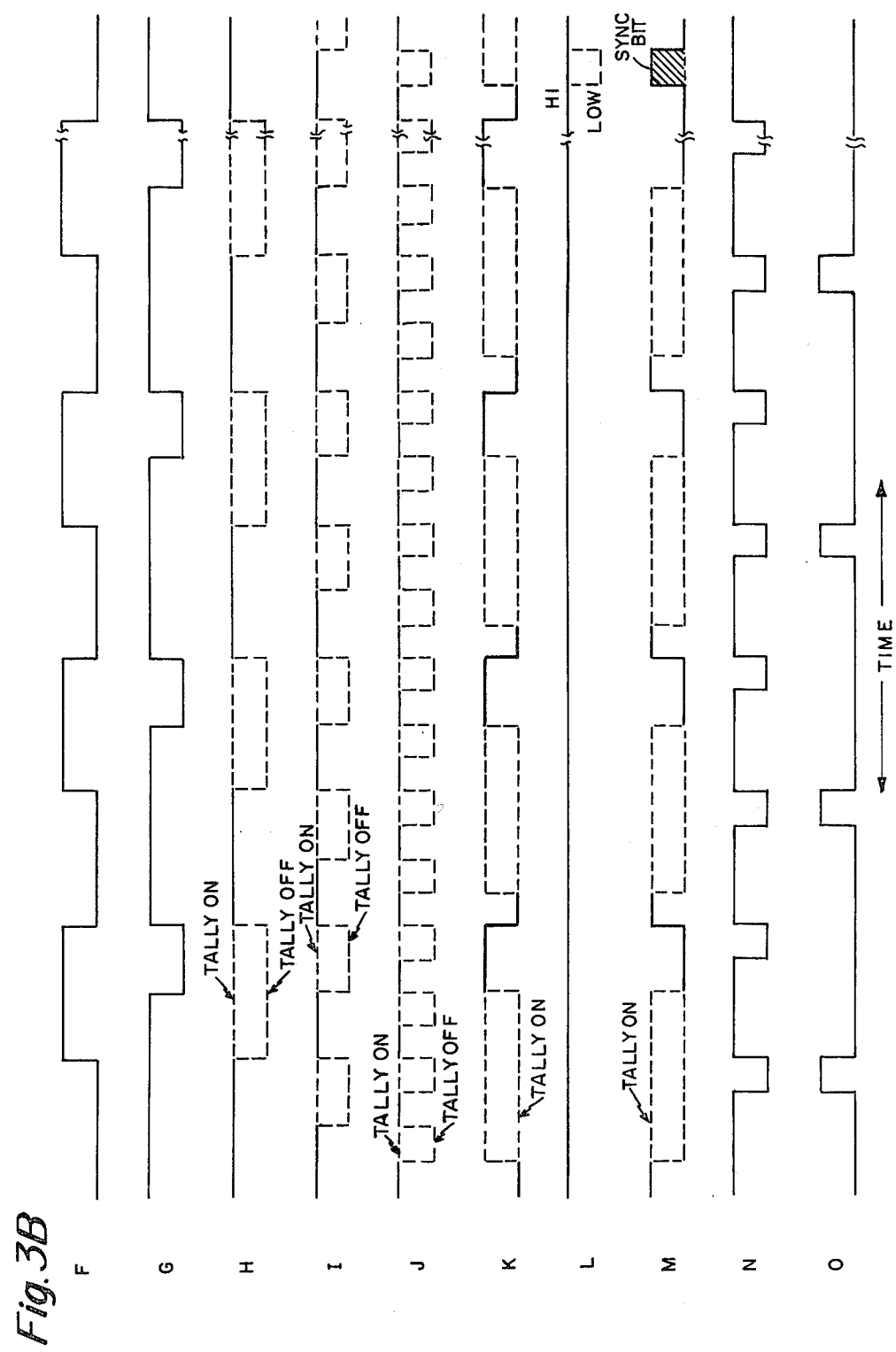

The format for the "tally" and "command" signals may be seen in curves A–C of FIG. 3. A complete data word of eight independent signals is transmitted in 4,577 microseconds (Curve A). This data word of 4,577 microseconds duration is divided into eight tally/command bit windows (Curves B & C); which correspond to the eight independent channels of tally command information.

Tally and command information is sent four times (quarter windows) during any given window. Certain periods of the tally signal (Curve B) are a "high" (1 volt peak to peak) voltage signal if a tally signal is present (ON) and "low" if the tally signal is "OFF". A sync bit is sent once during the entire data word of 4,577 μsec. For purposes of illustration, this sync bit is shown in dotted lines at the end of curve B of FIG. 3. In actuality, it is sent at the end of the eighth bit window to cause the unique occurrence at that point in time of a negative transition *immediately* followed by a positive transition just after the occurrence of a sync bit.

It should also be noted that the actual tally waveforms generated by the base unit will not rise vertically, as shown in curve B, but will have a slope which is limited to about 0.1 volt per microsecond. For proper operation, the voltage change with time ($dv/d_t$) must not be too large or it may induce a current to flow which interferes with the current signal. On the other hand, if $dv/d_t$ is too small, then the speed of operation is reduced.

The command signal labelled "current pulse" in curve C, is a current pulse of about 36 μsec duration. It is "high" (1.5 milliamp peak to peak) when a command is being generated (ON) and low when no command signal is being generated (OFF). It is possible in accordance with the invention, to have a tally signal being transmitted as a voltage pulse in one direction along the bus and a command signal in the opposite direction on the bus in the form of a current pulse. In a general way, the two signals are occurring simultaneously. But if observed more carefully, although the time scales are identical on waveform B and waveform C, the command current signals occur during the fifth and sixth 18 μsec periods of each quarter-window in a more or less dead period of the tally/sync voltage signal. Therefore, in accordance with the invention, voltage *changes* are not occurring during current pulses. This is to avoid cross-talk caused by a change of a *voltage* tally/sync signal producing a *current* pulse because of inherent line capacitance which would interfere with the *current* pulse of the command signal.

The reason that the same window can be used to transmit current pulses in one direction and voltage pulses in the other direction is that the total resistance, R, of the common wire bus is kept sufficiently small along with the total current, I, of the current command current pulses that the product of these two RXI (which by Ohm's Law equals the voltage caused by the command current pulses) is substantially smaller than the tally/sync voltage signal. More specifically, in a preferred embodiment, the current command pulse is 1.5 mA and line resistance is at most 30 ohms producing a current of about 50 mv which is 20 times less than the 1 volt tally/sync voltage signal. For this reason, the current doesn't cross-talk into the voltage signal.

The main reasons why the voltage signal doesn't cross-talk into the current signal is a combination of timing, as mentioned above, and keeping the magnitude of the rate of voltage change sufficiently low. There are two ways for voltage cross-talk to occur. The first, is through the parallel resistance across the bus. Ideally, the bus should have a very high impedance across it. In practice, the parallel resistance of each remote unit is greater than 10K ohms. So to reduce the magnitude of the current pulse generated by the voltage signal, the signal has a slope on it so that it doesn't change instantly from one value to another value, but takes about 10 microseconds to make a one volt transition. In other words, $dv/d_t$ is set at about 0.1 volts per microsecond and that keeps the current pulses generated by the voltage change at a reasonable magnitude. Secondly, as stated above, the voltage transitions in curve A are occurring at slightly different times than the current pulses in curve B and the current receiver in the base unit ignores those current pulses that are caused by such voltage transitions.

Base Unit—General

Referring now to FIG. 4, in which like numbers are retained, there is shown a detailed block diagram of the invention in connection with which further details of the invention will be discussed. FIG. 4 shows a typical base unit 100 on the left side connected via bus wire 120A and 120B (and common ground wire 122A and B) to one of N remote units 110; where in this embodiment N may be as many as 10.

Eight tally input signals shown by arrows 11 may be entered into tally interface 24 which converts the tally voltages from external instruments (not shown) to the proper voltage level to be used in the base unit. For example, the eight tally input signals might represent four functions of two machines or eight functions of one machine which is to be controlled by each of 10 remote units. If the machines were video tape recorders, the function might be stop, stand-by, rewind and play. The object then would be to indicate one or more of these functions at one of four lamps 47 in each remote unit 110. In this example, the lamps would be labelled STOP, STAND-BY, REWIND and PLAY. The tally/sync multiplexer 26 utilizes the tally information plus various clock signals from the clock generator 62 to generate the tally/sync voltage signal whose format is shown in FIG. 3 curve B. In essence, it is a time divisional multiplexer which converts the parallel tally signals on lines 25 to the serial bit stream shown in FIG. 3 curve B which is coupled to voltage transmitter 28.

The voltage transmitter 28 places the transmit voltage onto the common wire bus 120A and B. It also provides shortcircuit protection and protection from an excess of remote units being placed on the two wire bus 120A-B and 122A-B. The A.C. impedance of the output of the voltage transmitter 28 is very low, on the order of 0.5 ohms, which sets the A.C. impedance of the entire single common wire bus.

Also located in the base unit 100 is the current receiver 56 which receives and amplifies the current pulses shown in curve C FIG. 3 which are sent from one or more remote units 110. The current receiver 56 also contains clamp circuitry which helps separate the D.C. current which is drawn by the remote units from the A.C. current pulses which represent the command signals. The data bus format is designed to allow rapid clamping for this purpose.

The command demultiplexer 58 samples the received current signal at the appropriate time and latches the command data after it has received sufficient "confirmation" of a true command signal. A "powerup" signal from the power supply 64 is also utilized by the command demultiplexer (CDP) to avoid false commands on system powerup.

The command interface 60 serves an analogous, but reverse, function to the tally interface 24. The function of the command interface 60 is to translate the voltages of the command signals from the command demultiplexer 58 to the levels required to interface with an external machine.

The clock generator 62 supplies a variety of clock frequencies, i.e., 28 kHz, 14 kHz, 7 kHz, 3.5 kHz, 880 Hz, 440 Hz, and 220 Hz, which, inter alia, are utilized in the tally sync multiplexer, the command demultiplexer, and for the purposes of clamping in the current receiver.

Remote Unit—General

Referring now to the remote unit 110, the voltage receiver 30 separates the A.C. tally/sync signal from the D.C. 30 volt bias on the bus. The output of the voltage receiver 30 is sampled by the tally demultiplexer 34 and is also coupled to the reset detector 32 on line 33. The reset detector 32 generates a pulse which is coupled via line RST to the clock generator 38 and is used to synchronize the clock generator 38 at the remote unit 110 with the clock generator 62 at the base unit 100. A signal from the reset detector is also coupled via line $\overline{RST}$ to the sync presence detector 40 to determine that proper sync is being received. If proper sync is not being received, two things occur. First, the sync presence signal will be absent at line 59 to the remote unit's current transmitter 44, thus disabling that transmitter and preventing false commands. Additionally, if proper sync is not detected by the sync presence detector 40, the sync window signal on line 39, which normally is a very narrow pulse, will become a logical high. The sync window signal has the function of reducing false sync detection by inhibiting the reset detector during times outside the vicinity of the normal sync pulse. However, if normal sync is not present the window is, in effect, completely open to allow fast lockup to a sync signal, should it appear.

The tally demultiplexer 34 demultiplexes the serial stream of eight received voltage signals and produces four parallel D.C. signals which are coupled via lines 43 to the lamp drivers 36 to turn on the individual lamps 47. The tally demultiplexer, as well as the command multiplexer, may be preset to address either the low order four bits of the data bus format FIG. 3 curve B, or the high order four bits of the data bus format. Thus, two remote units operating in parallel on the data bus, could conceivably address all eight bits of command and tally information.

The lamp switching waveform generator 42 generates two tri-level logic signals at lines 42A and B which are used by the lamp drivers to connect the individual lamps, either between plus twelve volts D.C. and ground or between plus twelve volts and plus twenty-four volts D.C. The individual lamps are constantly being switched between these two connections. The net result is that the current requirements for a remote unit are cut in half, while at the same time, each lamp effectively receives an A.C. current, which increases lamp life dramatically due to cancellation of a metal migration effect.

Going from the remote unit 110 in the opposite direction to base unit 100, a command signal is originated by pressing one of the four buttons 49 to position B from position A thereby grounding line B and completing a voltage path to ground from a 7.2 volts D.C. source. This voltage signal is coupled to switch debouncing circuit 48.

The switch debouncing circuit 48 is a conventional RS flipflop circuit. The output of the switch debouncing circuit goes on lines 53 to the command multiplexer 50 which generates the appropriate logic signals to drive the current transmitter 44 which, in turn, places the current pulses (curve C FIG. 3) onto the common wire bus 120B.

Also located in the remote unit is a power separator 54. The power separator 54 separates and generates various power supply voltages from the 30 volt D.C. bias on the bus 120. It employs an "electronic inductor" which passes D.C. currents while presenting a high A.C. impedance to the bus. This high A.C. impedance is necessary to force the current pulses from the current transmitter to be reflected back to the base unit 100 rather than be short circuited into the power separator 54.

The beeper 52 produces a short burst of sinewaves at an audible frequency whenever a tally lamp 47 becomes activated while a command switch 49 is depressed.

Schematic Description

Figure 5A:
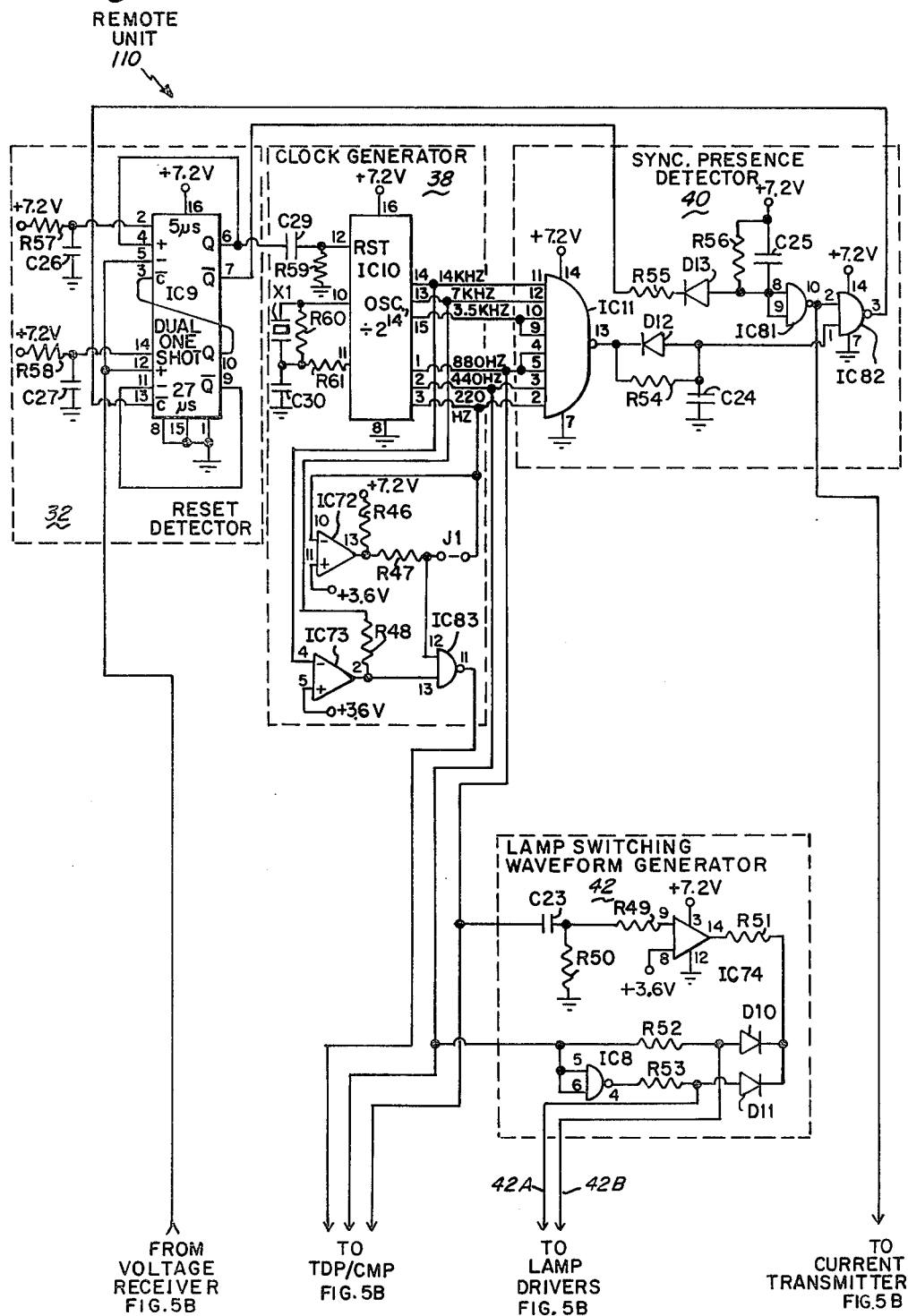

The overall description has now been completed. We will now describe with the aid of FIGS. 5–9 the individual circuitry required to generate the signals shown in FIG. 3. Like part numbers have been retained in FIGS. 5–9 from previous figures. In the first part of this description, we will trace the path of a command signal from switches 49 of FIG. 5 to the command interface FIG. 8.

A. Command Signal Flow

I. Switches 49

Each of switches S1–S4 are connected on one side to ground and on the other side in the "Off" position through 100K ohm resistors R30, R32, R34, and R36, respectively, in parallel with 10K ohm resistor R29 to 7.2 volts D.C. In the "On" position, parallel 100K ohm resistors R31, R33, R35 and R37 are switched in.

II. Debouncing Circuit 48

The debouncing circuit utilizes a QUAD C-MOS IC6 which is an R-S flip-flop which changes states when the wiper arms of switches S1–S4 hit the "On" contact and stays that way until the wiper arm hits the "Off" top contact.

Each output of IC6 is either 0 if the switch is ON or 7.2 volts D.C. if the switch if OFF. There are four parallel outputs from IC6 on pins 10, 9, 1 and 13. These parallel command signals are coupled to analog switch IC5 in the command multiplexer 50.

III. Command Multiplexer 50

The command multiplexer consists of an analog switch which takes the combination of the four command signal D.C. levels coming from the debouncing circuit 48 and based on some clocking information from clock generator 38, specifically an 880 hertz and 440 hertz clock signal and an inhibit signal, that appears on pins 10, 9 and 6, respectively, generates the waveform shown in FIG. 3A curve C. Lines A and B of analog switch IC5 contain two bits of information, for a total of four possible states of a combination A and B and these four states determine which of the four switches at any given moment are passed through the analog switch IC5. In other words, these states determine which of four possible windows in curve A of FIG. 3 are presently being addressed. The inhibit signal on "INH" forms the current pulses shown in FIG. 3, curve C.

The inhibit signal "INH" also shuts off the current transmitter 44 during the period of time allocated to the four windows which are not being addressed. Typically, the windows 508 which are not being addressed are inhibited to make sure that no commands are coming out at that point. In this manner, the four parallel input command signals are converted to time divided serial output signals at pin 13 of IC5. This output signal stream is coupled through R1 a 3.6K ohm resistor in the current transmitter 44.

IV. Current Transmitter 44

The current transmitter is a cascode circuit comprising transistor Q1, the base of which is normally at a high level of 7.2 volts as long as a sync presence signal is indicated from sync presence detector 40. If pin 13 of analog switch IC5 goes low that places about 6.5 volts potential across R1, a 3.6K Ohm resistor which causes the current to pull through R1. That current through the emitter of Q1 causes an almost identical current to flow through the collector and on to the bus wire on pin 3 of TB1.

This output current on pin 3 of TB1 is a 1.5 ma peak to peak current pulse as shown on curve C of FIG. 3. It should be noted that, while there are eight possible data windows of 572 μsec duration within a complete data word (curve A FIG. 3); typically each remote unit can address either the first four or the second four, thus, only four switches 49 are provided per remote unit 100. If a customer wants to address all eight, the customer can buy two remote units and, by setting the jumper J1, can set a remote unit to address either the first four or the second four windows. Likewise, there are only four lamps, 36 per remote unit, although there are eight tally inputs. The reason is that most customers only want to address two or three functions from a remote unit. Again, if they want to address more, they can add another remote unit and by an appropriate jumper wire, select which set of four windows to utilize.

V. Current Receiver 56

Figure 6:
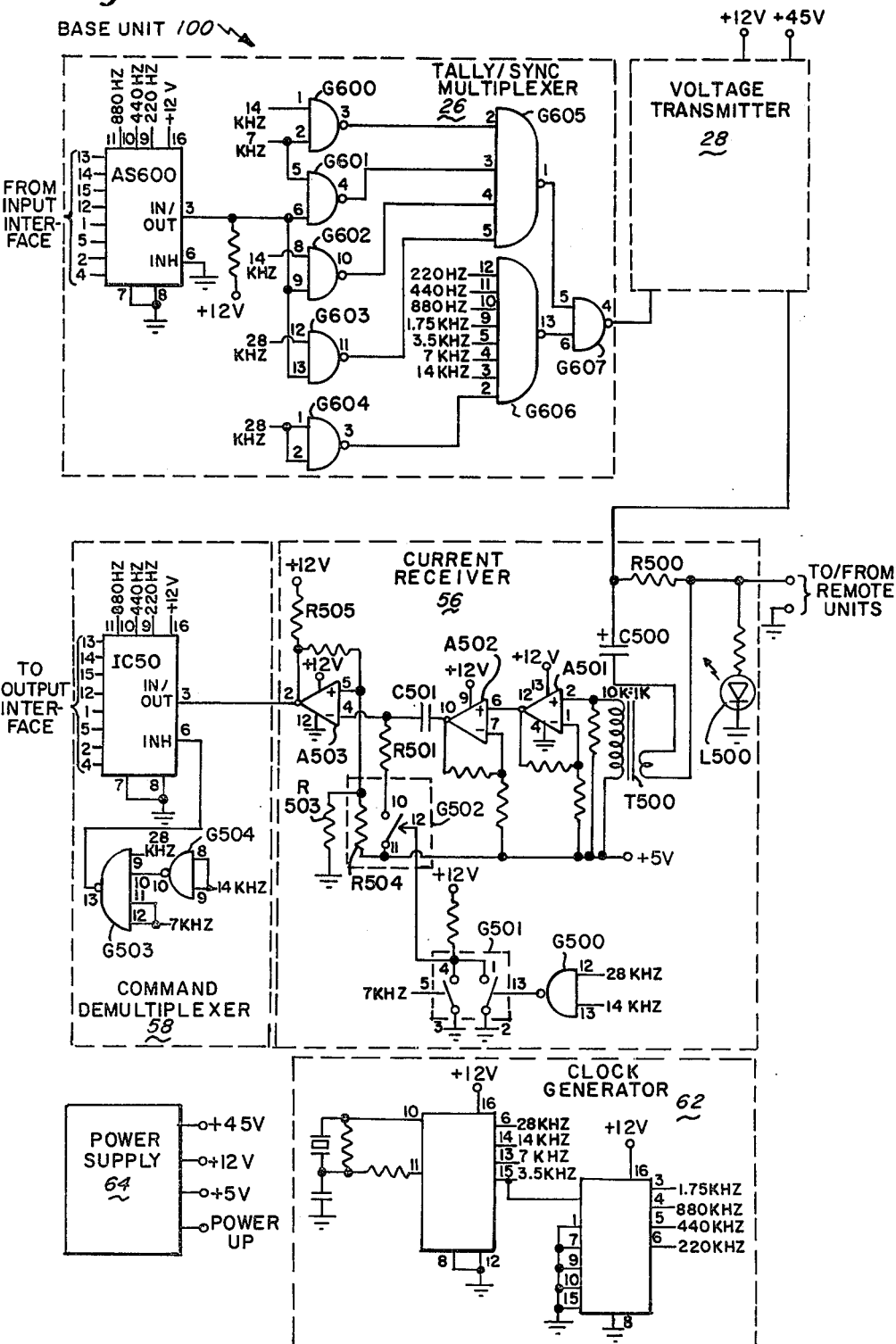
FIG. 6 is a schematic of a typical base unit of the invention.
Figure 7:
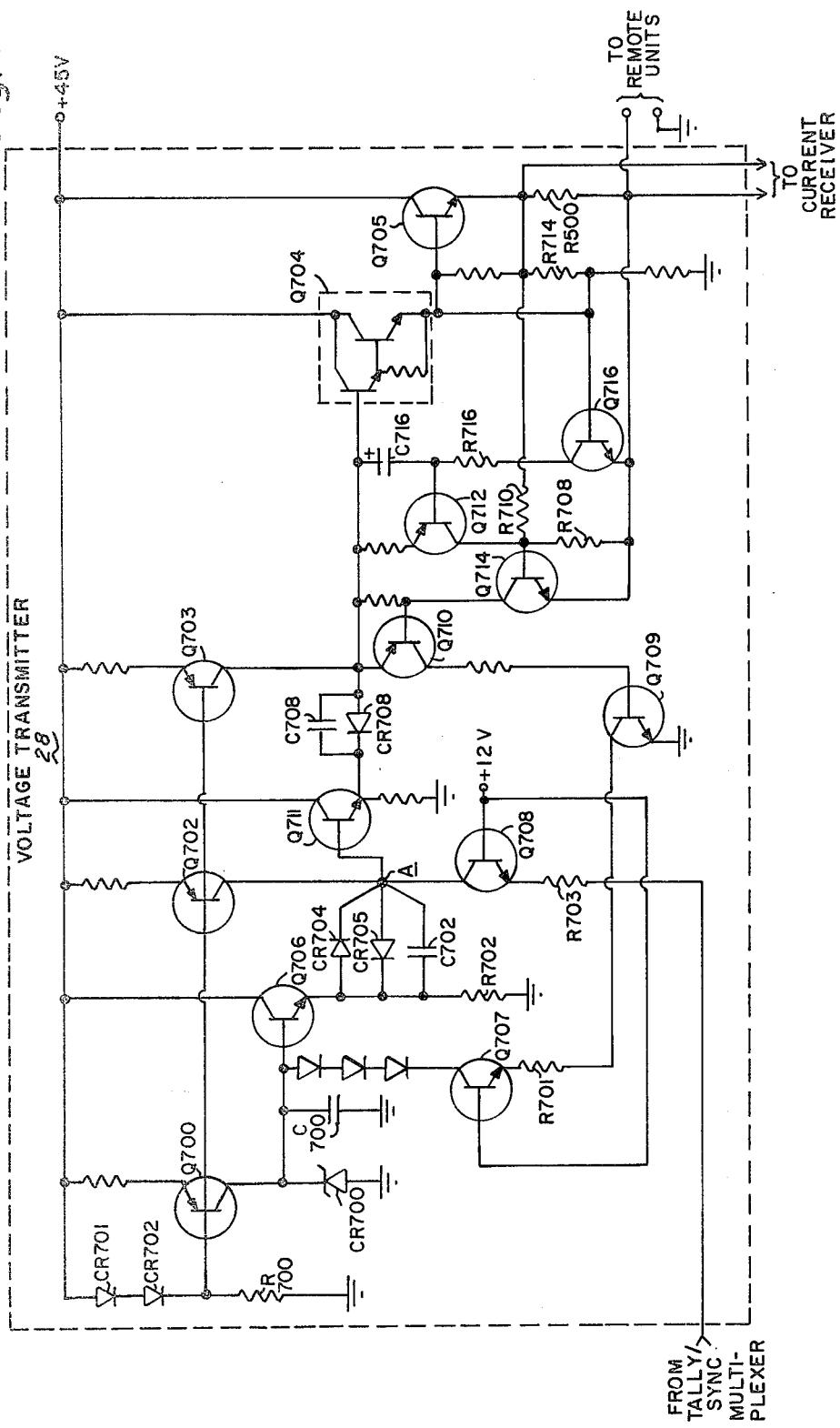
FIG. 7 is a schematic of a voltage transmitter for use in a base unit of the invention.

The current pulse signal on the bus wire from current transmitter 44 is picked off (converted to a voltage pulse) by a 0.5 ohm resistor R500 in current receiver 56 (See FIG. 6). This 0.5 ohm resistance presents a very low impedance to the bus wire. The small current signal through R500 creates a very small voltage signal which is coupled to the primary side (1K) of transformer T500. Coupling capacitor C500 prevents D.C. current from shorting through the transformer. Lamp L500 is an LED connected from the bus input to ground which indicates that a voltage is on the bus.

When current command signal of 1.5 ma has been transformed to a 0.7 millivolt signal at the primary of T500; it is then amplified up by the 10 to 1 impedance ratio of T500 and then amplified further by cascaded stages of dual operational amplifiers A501 and A502 whereupon it is clamped. The function of the clamping circuit may be explained in connection with FIG. 3 curve C. In order to detect the very small current pulses in the midst of the noise that is on the line, particularly due to currents induced by the effect of the tally voltage signal on the capacitance on the line; the command signal is clamped to a fixed reference just prior to the time of the current pulse. Then, a short time later, the voltage is sampled to see if it has changed indicating that a current pulse has occurred.

The logic for generating the sample pulses at the right time may be explained in connection with FIG. 3 curves D, E, F and N and FIG. 6.

Pin 12 of NAND gate G500 in current receiver 56 is fed by a 28 kHz signal from clock generator 62. The 28 kHz signal is shown at curve D of FIG. 3. The other input to NAND gate G500 is a 14 kHz signal from clock generator 62 shown as curve E of FIG. 3. The NAND of the 14 kHz and 28 kHz signal is curve N of FIG. 3 and this signal is coupled to pin 13 of analog switch G501. G501, in conjunction with G502, acts like two relay switches; the control for one of them is pin 13 of a G501, the control for the other is pin 5 of a G501. Pin 5 is fed by a 7 kHz clock signal from clock generator 62 (curve F of FIG. 3) and pin 13 is fed by NAND of the 28 kHz and 14 kHz from G500.

If either of these switches on G501 is closed, the clamp signal at the bottom side of the 100K resistor tied to +12 V.D.C. will be a low. Either switch has the capability of short circuiting that clamp signal to ground. If they are both open then the signal will go high. The output of G501 is curve O FIG. 3 which is the NOR of the 7 kHz signal (curve F) and the signal on pin 13 (curve N).

The clamp waveform is coupled through switch G502 to pin 10, a 4.7K resistor R501 and a 1000 picofarad capacitor C501. R501 and C501 have a time constant such that clamping doesn't occur instantly but occurs as the capacitor is charged or discharged for several time constants during the period of the clamp pulse. The R/C time constant of the capacitor and resistor is 4.7 µs and the duration of the clamp pulse is about 18 microseconds.

The clamp pulse connects a +5 volt reference level from the power supply to one side of capacitor C501, the other side of which is tied to the series amplifier A501 and A502. This +5 volt reference level is also closely related to the reference level for one side of comparator A503 via pin 5. The current pulse has been converted to a voltage signal and amplified to about 300 millivolts. If this A.C. signal is present on the right side of C501, it directly crosses the capacitor. This causes a 300 mv change on pin 4 of comparator A503. Pin 5 of comparator A503 is set slightly below 5 volts due to a voltage divider formed between a 39K resistor R503 and a 1K resistor R504. Pin 5 is set slightly lower than 5 volts, about 150 mv lower.

The difference in voltage between pins 4 and 5 of comparator A503 causes the output of the comparator at pin 2 to change state. These two states are either +12 volts D.C. or ground (zero) voltage. This output signal from A503 of the current receiver 56 is coupled to pin 3 of analog switch IC50 in command demultiplexer 58.

VI. Command Demultiplexer 58

The command demultiplexer IC50 is a 1 of 8 analog switch. This analog switch directs the output of the current receiver to any one of eight possible output interface circuits depending upon which bit window is being addressed at the time. Also, there's an inhibit input to IC50 which is used to sample A503 only at specific times, corresponding to the second half of a current pulse (corresponding to the sixth 18 µs period of a quarter window). The waveform for the inhibit circuitry is generated by NAND gates G503 and G504 which are fed by 14 kHz, 28 kHz and 7 kHz clock signals. The analog switch IC50 is inhibited during seven-eights of a window duration and samples during the remainder. Essentially, it takes the serial information, coming through the comparator A503 and converts it to parallel information at the output pins 12, 13, 14, 15, 1, 2, 4 and 5 of IC50.

Figure 8:
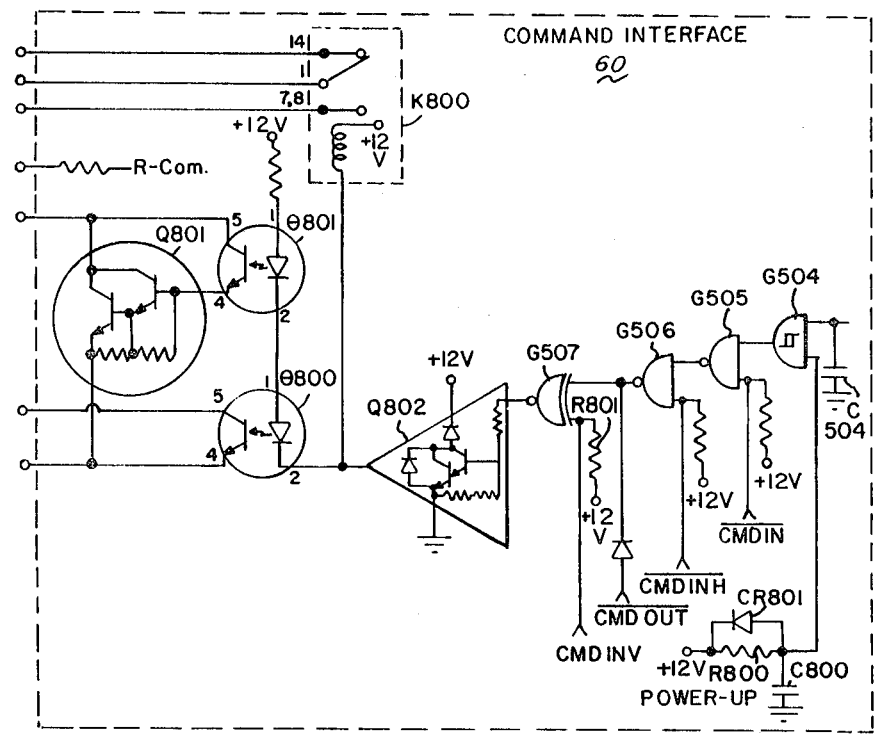
FIG. 8 is a schematic diagram of a command interface unit for use in a base unit of the invention.

These eight parallel signals are fed to one of the eight circuits in the command interface, only one of which is shown in FIG. 8.

VII. Command Interface 60

The first item encountered by the signal entering the command interface 60 is a 0.01 microfarad capacitor C504. The pulse data, which is sampled at certain times, is held on this capacitor C504, which functions as a "sample hold" circuit. A number of correct samples are required in order to sufficiently charge capacitor C504. The reason is that when A503 in FIG. 6 goes high, it is pulled up by a 51K ohm resistor, R505, which is a relatively high impedance. Therefore, not much current can go through R505 to charge the capacitor, especially since most of the time IC50 is shut off. IC50 is only "On" for 1/64th of the time in respect to a given capacitor C504 in the command interface. (It's only in the right window for ⅛ of the time and it's only sampling ⅛ of that). Therefore, capacitor C504 charges up slowly and it takes in the order of about 25 milliseconds, which is equivalent to a number of complete data words in order to get a command signal through the interface.

The purpose of this "sample-hold" circuit is to prevent "noise" signals from operating an instrument. In the system, about sixteen correct sample pulses in a row must be present before a command response is passed to gate 504. If one is missed, you start all over again because C504 discharges very fast.

The signal stored in C504 provides one input to Schmitt trigger NAND gate G504. If this input is above a certain threshold, the output of G504 changes its state. The other input to NAND gate G504 is a power-up signal. The absence of this signal indicates a power failure. In case of a momentary power failure no commands will be sent for a second or so after that period to avoid the possibility of some false commands during a brief period after return of power. The power-up circuit comprises a 0.1 microfarad capacitor C800 which discharges very fast through the diode CR801 if the 12 volts power is not present. On the other hand, C800 charges up very slowly through the 10 meg ohm resistor R800 so that it waits for a second or so after 12 volts is restored to the line.

Next, the command signal from G504 encounters three gates G505, G506 and G507. Three possible signals are coupled to these gates, $\overline{\text{Command In}}$, $\overline{\text{Command Inhibit}}$, and $\overline{\text{Command Out}}$. These gates are provided for accessory functions of the interface unit. For example, they can be used for a "gangstart" feature. In other words, the $\overline{\text{Command In}}$'s of several base units can be connected together and a machine started by pushing a button that would direct a $\overline{\text{Command In}}$ signal on all the base units. Another way these signals can be used is to connect the $\overline{\text{Command Out}}$ signal back to the $\overline{\text{Command In}}$ signal which then achieves a latch. The only way to get out of this latch is by putting a signal into the Command Inhibit line.

G507 is an Exclusive NOR gate. One input to this gate is a Command Invert signal which is tied through R801 to +12 V. Some machines want a positive going command signal, other machines want a negative going command signal. The polarity may vary even within a given machine for different commands. By tying Command Invert to ground, the Exclusive NOR gate 507 inverts the signal input.

The rest of the circuitry in the command interface 60 comprises power drivers and circuits which provide a variety of types of voltage and current levels or driving capabilities, because different types of machines may be operated by a base unit, hence they may require different voltages. Each output is opto-isolated so that the outputs are separated from ground since different machines may have different ground references for their commands. Opto-isolator 0800 is used to drive TTL type outputs. 0801 drives a Darlington power transistor Q801 for high current and high voltage applications where, for example, relays, or something of that nature, are being driven. Also, a relay output is provided by K800. Q802 is a driver circuit that is used to "drive" (provide enough current to operate) the relay K800 and the LED's of the opto-isolators 800 and 801.

This completes the signal path from the switches 49 of the remote unit 110 to the interface 60 of the base unit. We will now describe the opposite path from the tally interface 24 in base unit 100 to bulbs 47 in remote unit 110.

B. Tally/Sync Signal Flow

I. Tally Interface 24

Figure 9:
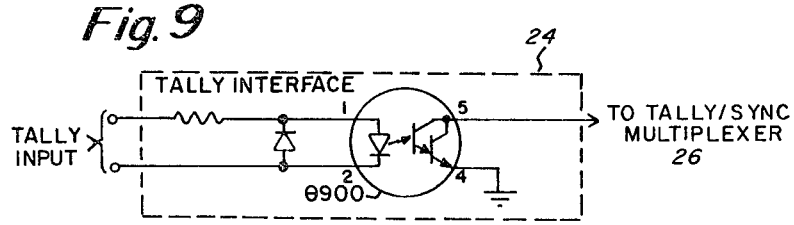
FIG. 9 is a schematic of a tally interface for use in a base unit of the invention.

The details of the tally interface circuit 24 are shown in FIG. 9. There are eight such circuits per base unit 100. Thus, there are provided eight opto-isolators θ900, one for each possible tally input signal. The opto-isolators allow the base unit circuits to be separated, or isolated, from ground. There are no electrical connections between one side of the opto-isolator and the other, so that no matter what the ground reference is from a machine, the opto-isolator can handle it. For example, any D.C. voltage into the lefthand side of the opto-isolator θ900 of the proper polarity will allow a small current to flow through the LED inside the opto-isolator producing light which will then trigger the Darlington transistor on the other side of the opto-isolator and cause a voltage change. This voltage change is coupled to one of eight parallel inputs to analog switch AS600 in tally/sync multiplexer 26 (FIG. 6).

II. Tally/Sync Multiplexer 26

AS600 converts the parallel input data to a serial bit stream at pin 3 of AS600 such that at any given time, pin 3 will represent the level on one of the eight input terminals.

From pin 3 of AS600 it is coupled through a series of NAND logic gates G601-G603 and G605 and G607 where at pin 4 of G607, it has the waveform whose format is shown in FIG. 3 curve B. The two inputs to gate G600 the 14 kHz and 7 kHz clock signals from clock generator 62 (curves E and F of FIG. 3) combine at output pin 3 to form the curve G of FIG. 3 which is one input to G605 at pin 2. The tally signal on pin 3 of AS600 is combined in NAND gates G601, G602 and G603 with respective clock pulses of 7 kHz, 14 kHz and 28 kHz to form the remaining three inputs to NAND gate G604 on pins 3, 4 and 5, respectively. The respective curves for the outputs of gates G601-603 are shown in curves H, I and J of FIG. 3.

The NAND of these four input signals on pin 1 of G605 is shown at curve K of FIG. 3. Note that the output of G605 is high, except when all four input signals are high, in which case the output goes low. Similarly, the output of eight input NAND gate G606 only goes low when all eight inputs are high. That occurs only at the very end of the data word in the second to the last eighteen microsecond period of the entire 4,577 microsecond data word duration.

The NAND of the signals on pin 1 of G605 and pin 13 of G606 is formed in G607 and results in the tally/sync waveform whose format is shown in FIG. 3 curve B at pin 4 of G607. This tally/sync signal is the input to the voltage transmitter 28 shown in detail in FIG. 7.

III. Voltage Transmitter 28

The input signal from pin 4 of gate G607 in the multiplexer 26 is coupled through 56K ohm resistor R703 to the emitter of transistor Q708, the base of which is at +12 volts D.C. and the collector of which is tied to a current node A formed at the intersection of two current sources.

One current source is transistor Q702 which has a 6.8K ohm emitter resistor coupled to +45 volts from the power supply 64. Q702 produces about 105 microamps of current out its collector and into current node A. The second current source, Q708, produces about 205 microamps of current into node A when the input signal to the voltage transmitter is low.

These two currents are added algebraically at node A so that a plus or minus 100 microamp current goes into or out the diode/capacitor network of CR704, CR705 and CR702 depending on the state of the input to the voltage transmitter.

A 100 microamp current through diode CR704 causes a ½ volt drop below the reference voltage of 33 volts at the lefthand side of the network. Concurrently, a 100 microamp current through CR705 will cause a ½ volt increase above the 33 volts reference voltage.

This reference voltage is established by zener diode CR700, the cathode of which is tied to the collector of transistor Q700. The base of Q700 is about 1.25 volts less than the 45 volts from power supply 64, as a result of the voltage drop across the voltage divider formed by diodes CR701 and CR702 and 10K ohm resistor R700.

This bias voltage 1.25 volts causes Q700 to conduct, thereby establishing a 33 volt potential at the cathode of zener diode CR700 which is coupled through emitter follower transistor Q706 to the left side of the diode/capacitor network previously referenced The 1000 picofarad capacitor C702 creates a ramp voltage to keep the $dv/d_t$ of the tally/sync voltage signal at a fixed amount. Assuming a 100 microamp current going into the 1,000 Pf capacitor yields a $dv/d_t$ of 0.1 volts per microsecond. Thus, at node "A", the output voltage signal has been basically formed. It now must go through some power stages and some circuitry to take care of certain possible current overload conditions. From node "A" the signal goes through an emitter follower transistor stage Q711 for buffering action. It then goes through diode CR708 in parallel with capacitor C708. In the event later circuit stages go into current limit, such as would occur if the output of the whole transmitter short-circuited to ground, the diode CR708 isolates the preceding stages. Normally, the diode is in forward conduction. The capacitor C708 smooths out a high frequency oscillation that can occur in emitter followers fed by diodes. The next stage consists of three emitter followers, two of which are in a single package Q704 and the last of which is a 2N 3055 power transistor Q705. The output of Q705 is fed directly to the output bus through half ohm resistor R500, previously mentioned in connection with the current receiver. The half ohm resistor R500 has two purposes: (1) as discussed before, it is a way of picking off the current signal, and (2) it is used to measure the current for current limiting in the event of a shorted output. If the output is short-circuited to ground, there are two sources of current limiting which come into play. The simplest one involves a pair of 20K ohm resistors R708 and R710 which form a voltage divider driving the base of a transistor Q714. If there's a dead short on the output bus such as would occur if a screwdriver were dropped across the bus and ground, the current through R500 increases considerably. That will produce a voltage drop. When the voltage drop gets to be about 1.2 volts, corresponding to about 2.5 amps of output current, there is enough voltage at the base of the current limit transistor Q714 at the junction of the two resistors R708 and R710 to turn transistor Q714 "on". When Q714 turns "on" the current serves to short circuit the signal into the emitter follower Q704. However, just before the current goes into current limit, the path of the short-circuiting action goes through the base/emitter junction of transistor Q710, the collector of which connects to a 100K ohm resistor which connects to the base of transistor Q709 which ties back through the collector to R701 to transistor Q707 and back to the 33 volt zener diode CR700. The effect of this feedback loop is to tend to reduce the reference voltage from the normal 33 volts to about 13 volts so that if someone places too many remote units on the line, before actually shutting down down the whole system, instead the reference voltage is lowered to compensate. The result is that the lamps 47 at the remote units will dim but the whole system will not shut down its data path.

The other current limiting path in voltage transmitter 28 is from the intersection of R500 and R714 a 2.4K ohm resistor which is connected to the base of transistor Q716, the collector of which is coupled to 1 megohm resistor R716. R716 is connected to the base of transistor Q712 and 10 microfarad capacitor C716. C716 supplies a long time constant for current limiting over an extended period of time. In such case, the current is limited from the reduced value of 2.4 amps resulting from short time current limiting previously described, to about 1 amp or less.

Thus, when Q712 is turned "On" by this feedback path, it causes the previously mentioned current limiting transistor Q714 to conduct, thereby reducing output current as previously described.

This completes the description of the signal path of the tally/sync signal through the base unit 100. We now refer to the remote unit 110 FIG. 5, where the tally/sync voltage pulse is coupled from the bus TB1, terminal 3 through C1, a 1000 pF capacitor, to voltage receiver 30.

IV. Voltage Receiver 30

Capacitor C1 couples the 1 volt peak to peak A.C. signal (riding on the 30 volt D.C. power signal) to a low pass noise filter formed by R39, R40 and C19 and C20. The D.C. is unable to pass through C1 and is picked off by power separator 54 which will be described later.

After the tally/sync signal passes through the low pass filter, it triggers IC71, a comparator circuit which has a small amount of positive feedback, through R42 so it acts like a Schmitt-Trigger. The output of IC71 at pin 6 is an inverted version of the tally/sync voltage signal. This signal is coupled in one direction to the reset detector 32 and in the other direction to the tally demultiplexer 34.

V. Tally Demultiplexer 34.

The tally demultiplexer input lead is pin 3 of IC5 which is coupled to the output of pin 1 of IC71. The voltage level at this point is either a high of 7.2 volts or a low of ground or zero volts. In the direction of the demultiplexer, the IC71 output goes through R44 and R45 which form a voltage divider. On one side of the voltage divider is the output of the IC71 and on the other side is 3.6 volts. This makes the voltage level as it appears at pin 3 of IC5 at either 25% or 75% of 7.2 volts depending upon the state of the comparator IC71. Thus, at pin 3 of IC5, the tally/sync voltage will be either 1.8 volts if the IC71 output is low or 5.4 volts if the output of IC71 is high. This voltage is then transferred by analog switch IC5 to one of four capacitors C15–C18 depending upon which window in the data word is being addressed. Thus, IC5 takes the serial input information and demultiplexes it into parallel information. Capacitors C15–C18 are 0.01 microfarad capacitors. The source impedance of the voltage at pin 3 of IC5 is 50K ohms, therefore it takes a certain number of pulses before the capacitors C15–18 will reach their final voltage value. This results in a circuit which is relatively immune from noise. The signals from IC5 pins 1, 2, 4 and 5 are next coupled to lamp driver circuit 36.

VI. Lamp Driver 36

The purpose of the lamp driving circuitry 36 is to provide enough current to "operate" (drive) the lamps but it drives them with a specific waveform. The lamps 47 are 12 volt bulbs. One side of each of the four lamps is always connected to the 12V+ supply. The other side of each lamp can be connected to either plus 24 volts or ground through respective transistor switches Q10–Q17 or if both pairs are open, the lamp is "floating" (connected to nowhere), in which case, there is no current flowing through a lamp. If a lamp is connected to +24 volts there is a net 12 volt potential across the lamp with the lefthand side of the lamp being positive. If a lamp is connected to ground, there is a net 12 volt potential across the lamp with the lefthand side of the lamp being negative. If, for example, both pair of transistors, switches Q10 and Q11, were to turn on alternately, the net result is a 12 volt peak or 24 volt peak to peak square wave across the lamp. This is advantageous for two reasons: (1) with a square wave across the lamp, rather than a D.C. voltage, the lamps tend to last longer, maybe two to six times longer, because metal migration is in alternate directions and cancels out; (2) it cuts down the current required by the remote unit 110 by a factor of two because each lamp, which may use 80ma of current, is only attached to the 24 volt power supply 50% of the time. With lower lamp current, more remote units can be put on the line before drawing too much current out of the power supply at the base unit 100. Also, the remote units can operate at greater distances of wire because the lamp current causes a voltage drop and the lower the current the less this drop will be per unit length of bus wire.

Another feature of the lamp circuits is that when the lamp is "Off", it is not completely "Off" but rather is in a very dim mode so that if a remote unit is used in a dark room, the legends on the bulb buttons can still be seen. Also, when the lamps are turned on they draw a tremendous surge of current. If they are left half way on, it reduces that surge of current, also they turn on faster and the size of filter capacitors that are needed in the power supply can be reduced.

The circuit which allows the lamps to be kept at half current is lampswitching waveform generator circuit 42.

VII. Lampswitching Waveform Generator 42

Figure 10:
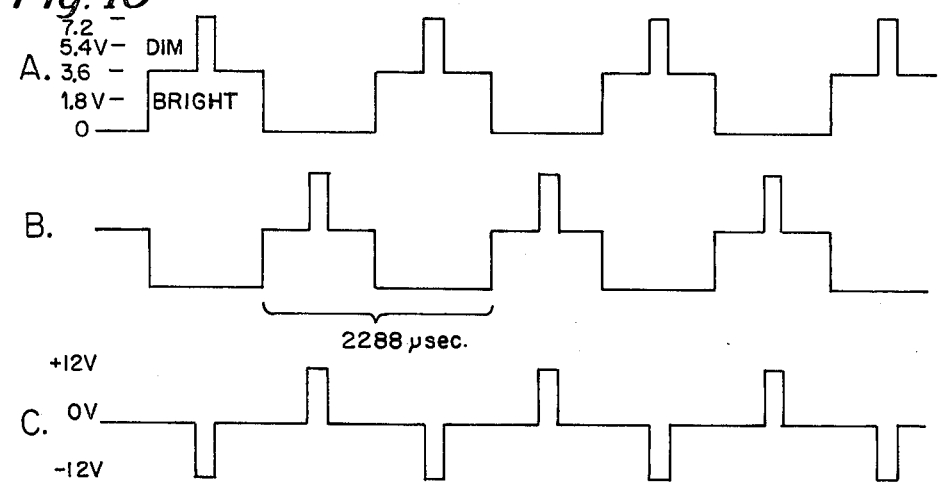
FIG. 10 is a series of waveform diagrams showing the voltage pulses used in the lamp driver and lamp switching waveform generator circuit of the invention.

The generator 42 provides a signal such that for much of the lamp duty cycle neither of the two switching transistors is on but occasionally one is switched "On" for a brief instant in time, then it goes "Off"; then the other one is switched "On" for a brief instant in time. The waveform on the lamp is shown at waveform C of FIG. 10. Most of the time it is at zero, briefly it is at minus 12 volts and briefly it is at plus 12 volts. This is accomplished by the signals from comparator IC3 and IC4. The switching waveforms which enable this function are provided from IC8 and R52, R53, D10 and D11 in lamp switch generator 42. Those waveforms are labelled A and B in FIG. 10. Waveform A is on line 42A FIG. 5 and waveform B on line 42B of FIG. 5. Waveforms A and B are coupled to respective plus and minus comparator inputs of IC3 and IC4. The other input to these comparators is the tally/sync voltage coming from capacitors C15 through C18. This input is at either 1.8 volts or 5.4 volts depending on whether a tally/sync signal is present or not. These 1.8 volt and 5.4 volt reference levels are shown in dotted lines on the diagram of the A and B waveforms of FIG. 10. The result of comparing the two inputs is that depending upon whether or not a tally/sync signal (from one of the capacitors C15 through C18) is 1.8 volts or 5.4 volts it will "cut through" or coincide with these A and B waveforms at different points in time, so that the switching transistors Q10–Q17 are switched on at the appropriate times. The 5.4 volt level from the capacitors corresponds to "dim" and the 1.8 volt level corresponds to "bright" or "tally on". If the tally signal is not present, the waveform goes to the 5.4 volt level and the tally is on "dim". If the tally signal is not present, the bulb lights dimly; if the tally signal is present, the bulb lights brightly.

NAND gate IC8 inverts the 440 hertz waveform. IC74, C23 and R50 set the time constant for the dim pulse on waveforms A and B. IC74 is fed from an 880 hertz clock generator signal.

Referring now back to the voltage receiver 30, we have traced this signal through to the lamp circuit 47. Now we will follow the other path through the reset detector 32.

VIII. Reset Detector 32

The reset detector comprises, in the main, a dual one-shot monostable multivibrator IC9, which sends out a pulse at a fixed repetition rate when properly triggered. The upper half of IC9 sends out a 5 microsecond pulse and the lower half a 27 microsecond pulse. Every time a positive transition occurs in the input signal to IC9 from IC71, the lower oneshot multivibrator of IC9 is fired, producing a 27 microsecond pulse at pin 10 which is fed to the upper half of one-shot multivibrator IC9 at input pin 3. If the lower oneshot multivibrator has fired, it then enables the upper one-shot multivibrator to have the potential to fire should a negative transition come into pin 5 within the 27 microsecond period. If no negative transition has occurred at pin 5 during the 27 microsecond period the upper one-shot multivibrator will not fire and reset the clock (pin 12 of IC10). If the 5 microsecond one-shot does fire, the signal goes out pin 6 through capacitor C29 which differentiates the 5 microsecond pulse forming a 1 microsecond sharp spike to reset the master clock IC10 a 4060 C-MOS oscillator and divider.

The output of IC9 pin 7 is a 5 microsecond inverted output of the upper oneshot multivibrator which goes low each time the multivibrator fires. This inverted output is coupled through resistor R55 and diode D13 and tends to "charge down" capacitor C25 in the sync presence detector 40 which normally floats at 7.2 volts because of the 10 meg ohm resistor R56. However, if negative going pulses are received at capacitor C25, it charges down toward ground and causes the state of Schmitt trigger NAND IC81 at pin 10 to change indicating that the reset pulses are present.

IX. Sync Presence Detector 40

This circuit 40 allows Q1, the current transmitter, to operate only when sync is present, thus avoiding false command current pulses if the clock generation circuitry at the "remote unit" is not locked to the base unit clock. If reset pulses are present, then IC81 pin 10 will go high because C25 must charge down. IC81 pin 10 is coupled to the base of transistor Q1, the current pulse transmitter. This "high" level at the base "enables" the transmitter Q1.

The output of sync presence detector IC81 pin 10 also goes to another NAND gate, pin 2 of a IC82. The output of the NAND gate IC82 pin 3 is the sync window gate pulse. The sync window is generated from the output of IC11 pin 13 which is an eight input NAND gate. The sync window is a pulse of variable width that allows the lower of the two one-shot multivibrators in IC9, i.e., the 27 microsecond one-shot; to be activated only during certain times in the complete data word. For discrimination purposes, ideally, the sync window pulse should be present only during the time span where sync will actually be found, so that a false sync signal in some other part of the word or a sporadic sync signal, would be ignored. When sync is missing, however, the sync window pulse is lengthened (window open) to cover the complete word; because if sync is missing, the clock generation at the remote unit is not locked to anything, so the circuit does not know where to put the window. The purpose of connecting the sync presence signal from IC81 pin 10 to IC82 pin 2, is to provide a function whereby, the lack of a sync presence signal opens up the window so that wherever a sync signal is found it will be acted upon.

Diode D12, resistor R54 and capacitor C24 have the effect of slightly extending the window. This is necessary because the crystal frequency at each end could be slightly off and the window is extended to make up for that. The operation of NAND gate IC11 is similar to that of NAND gate G606 previously described in the base unit (FIG. 6).

At the base unit end, the G606 gate is responsible for making the sync bit go high during the last part of the 8th window of the complete data word. At the remote unit end, the IC11 NAND gate is responsible for opening up the window in that same vicinity.

This completes the discussion of the tally/sync signal path. There now remain two circuits in the remote unit to discuss, the power separator 54 and the beeper 52.

X. Power Separator 54

The power separator is responsible for picking off the power supply voltage of 30 volts on the bus without creating a low impedance on the bus. It is necessary to maintain a high impedance input at the remote unit to keep the voltage signals from crosstalking to the current signals and vice-versa. The power separator circuitry comprises an electronic inductor which allows D.C. to pass through with a low impedance but maintains a high A.C. impedance. There are two sections to the separator 54. Transistor Q2 is a current source that sends current to zener diodes D3 and D4 which provide the basic logic power supply of 7.2 volts and 3.6 volts. By its nature, Q2 presents a very high impedance to the bus because it is a current source. Transistors Q3 Q6, Q7 and Q8 act as an electronic inductor, the time constant of which is established by the 10 microfarad capacitor C4 which prevents current through Q8 from changing very fast. The current through Q8 can ramp up or ramp down at a maximum rate of change of about 1 amp per second.

Transistor Q5 acts as an emergency safety valve, in effect, for the 24 volt power supply voltage which is stored on C5 and C6. If several lamps 47 are "On" and suddenly all the lamps are turned "Off", C6 in the electronic inductor prevents the current from diminishing too fast. The current has to continue to flow for a certain period of time through Q8 but yet there are no lamps for the current to go drive. C5 and C6 will take up some of the slack but eventually even they will charge up to a high voltage. But, as soon as the voltage at the top of C5 exceeds a reference voltage established by the zener diode D5 the excess current is bypassed to ground through Q4 and Q5.

The power separator also has a circuit that will automatically reduce the voltage at the output of the 24 volt supply J2 to several volts below whatever voltage is coming into the unit from the bus in the event of a brownout or an extra long bus wire, so that the transistors in the electronic inductor will always be biased properly.

The 25 volts reference voltage is established by zener diode D5 which is fed by current source transistor Q3. If the voltage at the top of emitter resistor R4 (the voltage on the bus) gets too low, eventually transistor Q6, the base of which is coupled to the collector of Q3, will turn "Off" and when that happens, zener diode D5 will have less current and will drop in voltage. In this way, the circuit still acts as an electronic inductor even if the voltages on the bus are dropped considerably.

XI. Beeper 52

The purpose of the beeper circuit is to produce a short beep with an acoustic transducer B1 when a tally light 47 goes "On", indicating to the operator that when a play switch 43 was pushed, that indeed the machine at the base unit went into "play" and the tally light from the machine indicated that it is in "play" in which case a beep occurs to complete the feedback loop to the operator. To do this, the tally signal is taken from C15-C18 to the tally demultiplexer IC5 to drive one side of the beeper circuitry at capacitor C7. A second signal is taken from switches 49 to drive the other side of the beeper circuitry at transistor Q9.

When a tally/sync signal is present at the multiplexer IC5, for example at C15 the voltage at C15 is reduced from 5.4 volts to about 1.8 volts, as previously mentioned. This sudden voltage change induces a current pulse from ground through R11 which eventually, as C15 is charged down, causes a sufficient voltage drop across R11 to trigger comparator IC85. The output of IC85 at pin 14 will then go low, since it's an open collector output comparator. When pin 14 is low, capacitor C8 is discharged for about 7 milliseconds, the RC time constant of R12 and C8. The net effect of IC85 and IC86 is to act as a pulse stretcher to fill in the gap between the series of pulses coming from C15.

So, if a tally/sync signal is present at appropriate intervals on C15 a stretched-out signal of about 20 milliseconds duration will appear at pin 13 of IC86 which is sufficiently long to trigger IC87. If the pulse at pin 13 is shorter, that indicates that noise of some sort may have caused a false tally signal, in which event, the beeper will not be triggered by IC87.

The second input to the beeper 52 is from the switches 49 to the base of transistor Q9. In order for Q9 to be turned "On", i.e., conduct, one of the switches S1-S4 has to be in the "down" or "On" position. When one of the four switches is in the "down" position, one of the pullup resistors, either R31, R33, R35 or R37 has current flowing through from ground through the wiper arm of a switch. That current goes up through R29, a 10K ohm resistor to the 7.2 volts power supply and produces a voltage drop across the 10K ohm resistor R29 which triggers transistor Q9 "On". When Q9 is conducting, it provides potential for a "beep" to occur at B1. C9 is a 0.1 microfarad capacitor which stores sufficient charge to extend the effect of the switches being "down".

The last comparator circuit is IC88 and R15, and C11. This circuit sets the actual length of the "beep" with a 10 meg ohm resistor R15 and a 0.01 capacitor C11. It is set for about 50 microseconds or a 1/20th second "beep" which is quite audible. When pin 1 of IC88 is low, it causes current to flow through diodes D6 and D7 at the output of IC89 which shortcircuits the output of IC89 back to the input of beeper oscillator IC89 and shuts it off. However, when pin 1 of IC88 is high, indicating a tally signal *and* a corresponding button pressed, current no longer flows through D6 and D7 in a direction to shortcircuit IC89 and it breaks into oscillations which drive beeper B1.

Equivalents

We have completed a description of one preferred embodiment of the invention. Those skilled in the art will recognize or be able to ascertain, using no more than routine experimentation, other equivalents for the specific apparatus and methods described herein. Such equivalents are intended to be included within the scope of the following claims.

I claim:

1. The method of communicating in one direction in the form of current modulated signals and in the opposite direction in the form of voltage modulated signals and wherein cross-talk between signals is minimized by preventing changes in the signals from being present simultaneously; and wherein cross-talk is further minimized by fixing the rate of change of voltage per unit time, $dv/d_t$ within a predetermined range such that the current induced by $dv/d_t$ is much less than the amplitude of the current modulations.

2. A data communication system comprising:
   (a) a first unit wherein apparatus capable of performing a plurality of functions is located;
   (b) a plurality of second units interconnected with said first unit by a common wire;
   (c) current transmitter means in said second units for producing current signals on said common wire to initiate operation of a function by the apparatus of said first unit;
(d) voltage transmitter means in said first unit for producing voltage signals on said common wire to indicate at said second units the status of said apparatus; said voltage signals being imposed on a D.C. power supply voltage present on the common wire and wherein the D.C. power supply voltage is reduced, with out interfering with the voltage signal, in the event too many second units are connected to the common wire.

3. A data communication system comprising:
(a) a first unit wherein apparatus capable of performing a plurality of functions is located;
(b) a plurality of second units interconnected with said first unit by a common wire;
(c) current transmitter means in said second units for producing current signals on said common wire to initiate operation of a function by the apparatus of said first unit;
(d) voltage transmitter means in said first unit for producing voltage signals on said common wire to indicate at said second units the status of said apparatus; and
(e) wherein the means at said second units for indicating the status comprises lamps fed by a D.C. voltage of a certain magnitude converted to an alternating voltage of one-half of said magnitude.

4. A data communication system comprising:
(a) a first unit wherein apparatus capable of performing a plurality of functions is located;
(b) a plurality of second units interconnected with said first unit by a common wire;
(c) current transmitter means in said second units for producing current signals on said common wire to initiate operation of a function by the apparatus of said first unit;
(d) voltage transmitter means in said first unit for producing voltage signals on said common wire to indicate at said second units the status of said apparatus; and
(e) means for limiting the magnitude of the current signals to a predetermined value X in the event of a short-term overload and to a value Y in the event of a long-term overload; wherein X is an order of magnitude greater than Y.

5. In a method for communicating between:
(a) a first unit wherein apparatus capable of performing a plurality of functions is located, and
(b) a plurality of second units interconnected with first unit by a common wire; the steps of:
(1) producing current signals on said common wire to initiate operation of a function by the apparatus of said first unit; and
(2) producing voltage signals on said common wire to indicate at said second units the status of said apparatus; and
(3) impressing the voltage signals on a D.C. power supply voltage; and
(4) reducing the D.C. power supply voltage without interfering with the voltage signal, in the event too many second units are connected to the common wire.

6. In a method for communicating between:
(a) a first unit wherein apparatus capable of performing a plurality of functions is located, and
(b) a plurality of second units interconnected with first unit by a common wire; the steps of:
(1) producing current signals on said common wire to initiate operation of a function by the apparatus of said first unit; and
(2) producing voltage signals on said common wire to indicate at said second units the status of said apparatus; and
(3) limiting the current on the line to a predetermined value X in the event of a short-term overload and to a value of Y in the event of long-term overload, wherein X is an order of magnitude greater than Y.

7. Apparatus comprising a communication channel for transmitting and receiving data wherein the data is communicated in one direction in said channel in the form of current modulations and in the opposite direction in the form of voltage modulations and wherein cross-talk between data is minimized by preventing changes in the modulations from occurring simultaneously and wherein cross-talk is further minimized by fixing the rate of change of voltage per unit time, $dv/d_t$ within a range such that the current induced by $dv/d_t$ is much less than the amplitude of the current modulations.

8. The system of claim 3 in which the alternating voltage is a square wave.

9. The apparatus of claim 3 including receiver means in said second unit for producing an audible sound when a status lamp is energized while a voltage signal corresponding to the function of the status lamp is being transmitted.

10. The apparatus of claim 4 wherein the rate of change of the voltage signal with time, $dv/d_t$ is a predetermined range of values such that the current induced by $dv/d_t$ is much less than the amplitude of the current modulations thereby to avoid cross-talk between signals.

11. The method of claim 5 including the step of transmitting the voltage and current signals simultaneously on said common wire travelling in opposite directions.

12. The method of claim 11 wherein the rate of change of the voltage signal with time, $dv/d_t$ is held within a predetermined range of values sufficient to avoid cross-talk between signals.

13. The method of claim 11 wherein changes in current and voltage signals occur at different time intervals.

14. The method of claim 11 wherein the first unit presents a low impedance to the current signals from the second units and the second units present a high impedance to the voltage signal from the first unit.

15. The method of claim 1 in which the communication channel is a single bus wire.

* * * * *